United States Patent
Kokku et al.

(10) Patent No.: US 9,055,456 B2
(45) Date of Patent: Jun. 9, 2015

(54) REMOTE VIRTUALIZATION OF A CELLULAR BASESTATION

(75) Inventors: Ravindranath Kokku, Hyderabad (IN); Rajesh Mahindra, Highland Park, NJ (US); Honghai Zhang, Ewing, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 534 days.

(21) Appl. No.: 13/173,796

(22) Filed: Jun. 30, 2011

(65) Prior Publication Data

US 2012/0002620 A1 Jan. 5, 2012

Related U.S. Application Data

(60) Provisional application No. 61/437,168, filed on Jan. 28, 2011, provisional application No. 61/360,953, filed on Jul. 2, 2010, provisional application No. 61/361,009, filed on Jul. 2, 2010.

(51) Int. Cl.
| | | |
|---|---|---|
| *H04W 4/00* | (2009.01) | |
| *H04W 28/02* | (2009.01) | |
| *H04L 12/801* | (2013.01) | |
| *H04L 12/815* | (2013.01) | |
| *H04L 12/851* | (2013.01) | |
| *H04W 28/10* | (2009.01) | |

(52) U.S. Cl.
CPC ............... *H04W 28/02* (2013.01); *H04L 47/14* (2013.01); *H04L 47/19* (2013.01); *H04L 47/22* (2013.01); *H04L 47/2408* (2013.01); *H04L 47/2441* (2013.01); *H04W 28/10* (2013.01)

(58) Field of Classification Search
CPC ... H04W 24/02; H04W 88/08; H04W 72/042; H04W 24/10; H04W 36/30; H04W 72/04; H04W 24/00; H04W 88/085; H04W 24/08; H04W 36/08; H04W 84/005
USPC .......... 370/328, 329, 352, 235, 252, 254, 278
See application file for complete search history.

(56) References Cited

U.S. PATENT DOCUMENTS

| | | | | |
|---|---|---|---|---|
| 7,986,915 | B1 * | 7/2011 | Wang et al. | 455/7 |
| 2007/0280175 | A1 * | 12/2007 | Cheng et al. | 370/338 |
| 2009/0161683 | A1 * | 6/2009 | Allie et al. | 370/401 |
| 2009/0209265 | A1 * | 8/2009 | Kwon et al. | 455/454 |
| 2010/0142471 | A1 * | 6/2010 | Cheng et al. | 370/329 |
| 2011/0026501 | A1 * | 2/2011 | Sharaga et al. | 370/338 |
| 2011/0201334 | A1 * | 8/2011 | Rosenqvist et al. | 455/436 |
| 2011/0250900 | A1 * | 10/2011 | Kokku et al. | 455/450 |
| 2012/0051296 | A1 * | 3/2012 | Kokku et al. | 370/329 |

* cited by examiner

*Primary Examiner* — Asad Nawaz
*Assistant Examiner* — Najeebuddin Ansari
(74) *Attorney, Agent, or Firm* — Joseph Kolodka; Akitaka Kimura

(57) ABSTRACT

The present invention is directed to a method employing a basestation with downlink and uplink flows of information between users; remotely virtualizing the flows from an entity external to the basestation without any modification to the basestation; and creating virtual basestations or networks responsive to the remotely virtualizing.

2 Claims, 4 Drawing Sheets

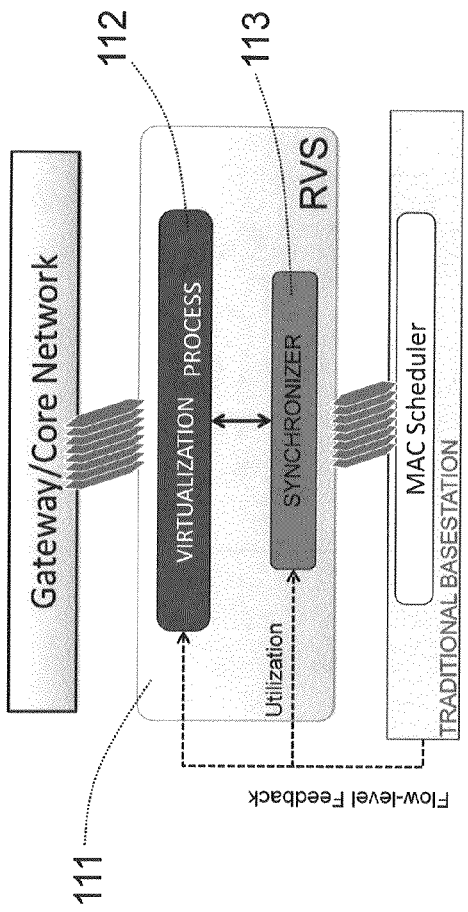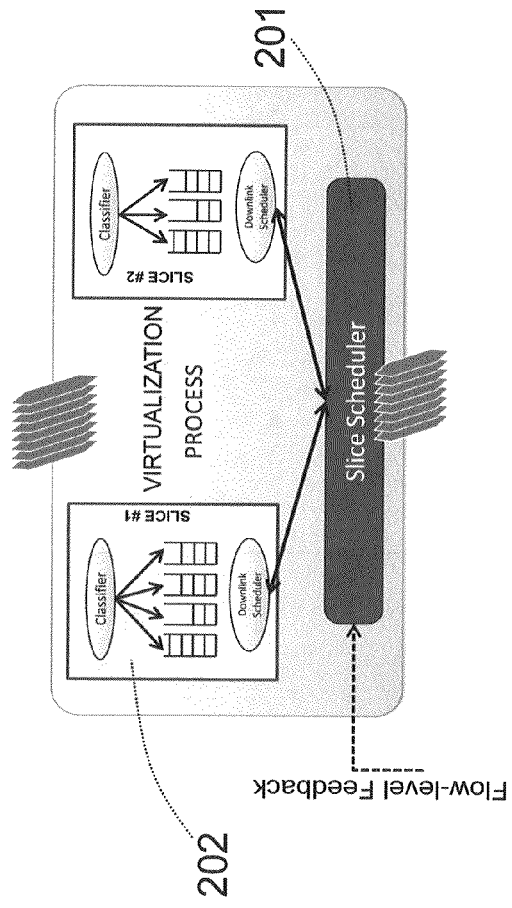

REMOTE VIRTUALIZATION OF A CELLULAR BASESTATION

This application claims the benefit of the following U.S. Provisional Application No. 61/437,168, entitled, "Remote Virtualization of wireless Resources on Cellular Basestations", filed Jan. 28, 2011; and U.S. Provisional Application No. 61/361,009, "A Method for Remotely Virtualizing a Cellular Basestations", and is related to U.S. application Ser. No. 13/037,442, entitled, "Method and System for Virtualizing a Cellular Basestation", filed Mar. 1, 2011, of which the contents of all are incorporated herein by reference.

BACKGROUND OF THE INVENTION

The present invention relates generally to broadband and wireless communications and more particularly to remote virtualization of a cellular basestation.

The present invention is employed as an RVS (Remote Virtualization Substrate) that includes architecture for enabling a process for effective virtualization of traditional cellular basestations from a gateway node external to the basestation in technologies such as WiMAX and LTE.

Virtualization of a basestation enables efficiently deploying customized services and protocols with diverse performance objectives in isolated slices on the same-shared substrate. Several interesting deployment scenarios benefit from effectively virtualizing wireless resources. An exemplary scenario including mobile virtual network operators (MVNOs), corporate bundle plans, corporate intranets, evaluation testbeds, and services with leased networks (SLNs), see the diagram in FIG. 1.

Mobile virtual network operators MVNOs are emerging as strong players in the mobile network market to provide enhanced services such as video telephony, live streaming and interactive games (along with traditional voice services) to focused customers. This model is argued to be a win-win situation for both MVNOs and MNOs, since MVNOs help mobile network operators MNOs attract and retain a greater number of customers.

Regarding corporate bundle plans, as revenue from voice services is decreasing rapidly, data services are receiving increased focus from WiMAX, 3G and LTE network operators. Already, more sophisticated data plans for revenue generation on 3G networks have emerged, and are constantly evolving. Many of these sophisticated data plans include corporate bundle plans where the bandwidth is shared across a group of employees of a corporation.

Regarding corporate intranets or evaluation of innovations (testbeds), virtualization can help MNOs and researchers by isolating wireless resources, and providing a way to deploy and test innovative ideas, while running operational networks. This provides a win-win situation for both network providers and researchers.

Regarding services with leased networks (SLNs), in the future, we envision that service providers would be increasingly interested in paying the network operators on behalf of the users to enhance users' quality of experience. For example, one can envision a maps service provider paying a network operator to reserve certain amount of bandwidth on base stations near highways for speeding up user requests.

Past virtualization efforts have focused on 802.11 (Wifi) technology that is not applicable to cellular technologies. One prior work proposed a shaping solution for achieving fairness across flows/slices with single flows. This work does not discuss how multiple flows of different quality-of-service QoS classes within a slice will be able to share the slice resources without interference on the basestation. Wired network virtualization has been done in the past in several ways, but their solutions do not fit wireless networks due to the inherent wireless domain characteristics such as channel fluctuations and capacity variations.

Existing cellular basestations supporting virtual network operators (MVNOs) do not provide any isolation across different operators. They just allow the users of all the operators to access the resources uniformly.

Accordingly, there is a need for improved virtualization of a cellular basestation.

BRIEF SUMMARY OF THE INVENTION

The present invention is directed to a method employing a basestation with downlink and uplink flows of information between users; remotely virtualizing the flows from an entity external to the basestation without any modification to the basestation; and creating virtual basestations or networks responsive to the remotely virtualizing.

In a preferred embodiment of the invention, the remotely virtualizing includes a virtualizing process for scheduling packets from different slices of the flows, a slice scheduler using different flow-level feedback to schedule packets of different the flows of the different slices responsive to reservations made by scheduling policies for said slices, and a synchronizer for monitoring and shaping the flows to said basestation to synchronize said virtualization process with a scheduler of the basestation. Preferably, the virtual process and synchronizer are executable from outside said basestation.

In an alternative expression of the invention, a method includes employing a basestation with downlink and uplink flows of information between users; remotely virtualizing the flows from an entity external to the basestation without any modification to the basestation and including a synchronizer for pulling packets from a slice scheduler of the flows at a rate that matches available capacity of the basestation, the synchronizer operable in two states for ensuring utilization of wireless resources while avoiding queue build-up in the basestation, scheduling of the flows in the basestation influencing slice scheduling decisions for compromising isolation across different slices of the flows responsive to queues in the basestation getting backlogged; and creating virtual basestations or networks responsive to the remotely virtualizing.

These and other advantages of the invention will be apparent to those of ordinary skill in the art by reference to the following detailed description and the accompanying drawings.

BRIEF DESCRIPTION OF THE DRAWINGS

FIG. 1B is an exemplary block diagram depicting an exemplary configuration that enables remote virtualization of DOWNLINK wireless resources, in accordance with the invention;

FIG. 2 is a an exemplary block diagram detailing the virtualization shown in FIG. 1B, in accordance with the invention;

DETAILED DESCRIPTION

The present invention is directed to remote virtualization of a traditional cellular basestation. The present invention encompasses remote virtualization of DOWNLINK and UPLINK wireless resources.

Figure 1A:
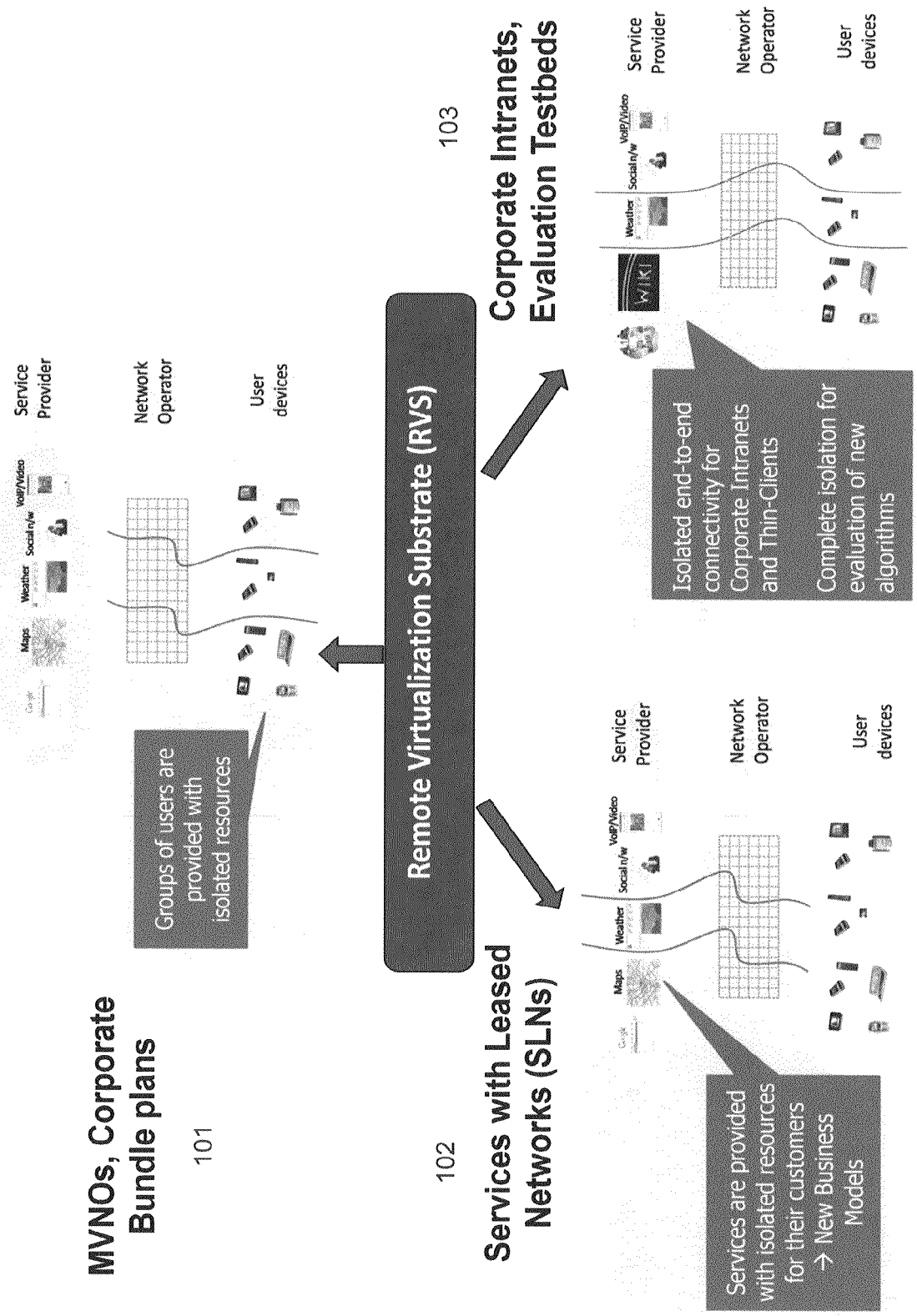
FIG. 1A depicts an exemplary scenario including mobile virtual network operators (MVNOs), corporate bundle plans, corporate intranets, evaluation testbeds, and services with leased networks (SLNs) in which the present invention can be employed.

Referring now to an exemplary configuration in FIG. 1B, in the downlink virtualization mode, the virtualization process 112 provides slice isolation with a utility-optimized resource allocation, and enables slices to perform customized resource management. A synchronizer 113 operates in 2 phases to synchronize the virtualization process with the basestation scheduler so that the order of the packets decided by the virtualization process is maintained by the basestation scheduler, while avoiding queue buildup at the basestations. The synchronizer outputs to the basestation, which includes a media access control MAC scheduler.

The configuration of the synchronizer ensures that the inventive remote virtualization can virtualize basestations of different technologies from different manufacturers without modifications to the basestation. The inventive virtualization also ensures that virtualization is oblivious to the lower-level optimizations on basestations, such as multiple-input multiple-output MIMO techniques, multi-user MIMO, hybrid automatic repeat request HARQ, etc. Consequently, the inventive virtualization fosters the realization of diverse deployment scenarios such as well-isolated virtual services, virtual networks, and corporate networks using a virtualization technique on a node external to the basestation.

The inventive remote virtualization 111 enables remote virtualization of a traditional basestation without any modification to the basestation software. The inventive remote virtualization can work for basestations of different technologies, such as WiMAX, LTE etc. The RVS assumes that flow-level feedback is available from the basestation, such as the modulation and coding scheme (MCS) used for each flow. Although the inventive virtualization is depicted as a standalone solution, it can be deployed as part of the basestation or a gateway behind the basestation.

Virtualization of a basestation includes aggregating flows into sets (defined as a "slice") and allocating resources to each set in a combined fashion. The virtualization process 112 can be implemented in several ways. The remote virtualization process is agnostic to the specific implementations of the virtualization process as long as the interface to the synchronizer meets a well-defined structure. An exemplary configuration of the virtualization process NVS is shown in FIG. 2. The main component is a Slice Scheduler 201 that provides (1) isolation across slices and (2) customization 202 within a slice such as slice-specific flow management or application optimizations.

The goal of the slice scheduler 201 is to schedule the order of packet transmissions from the different slices in order to meet the above two requirements. A slice scheduler would typically require feedback for every flow to the basestation. Most commercial basestations provide such functionality. The present remote virtualization requires that the virtualization process implement the feedback interface to facilitate integration with different basestations. Hence, the inventive remote virtualization enables custom virtualization solutions to remotely virtualize a cellular basestation without modifications to the basestation.

The inventive synchronizer 113 makes the virtualization process compatible with any traditional cellular basestation. The goal of the synchronizer is to dequeue the packets scheduled by the virtualization software at a rate that is as close to the aggregate wireless capacity of the basestation.

Figure 3:
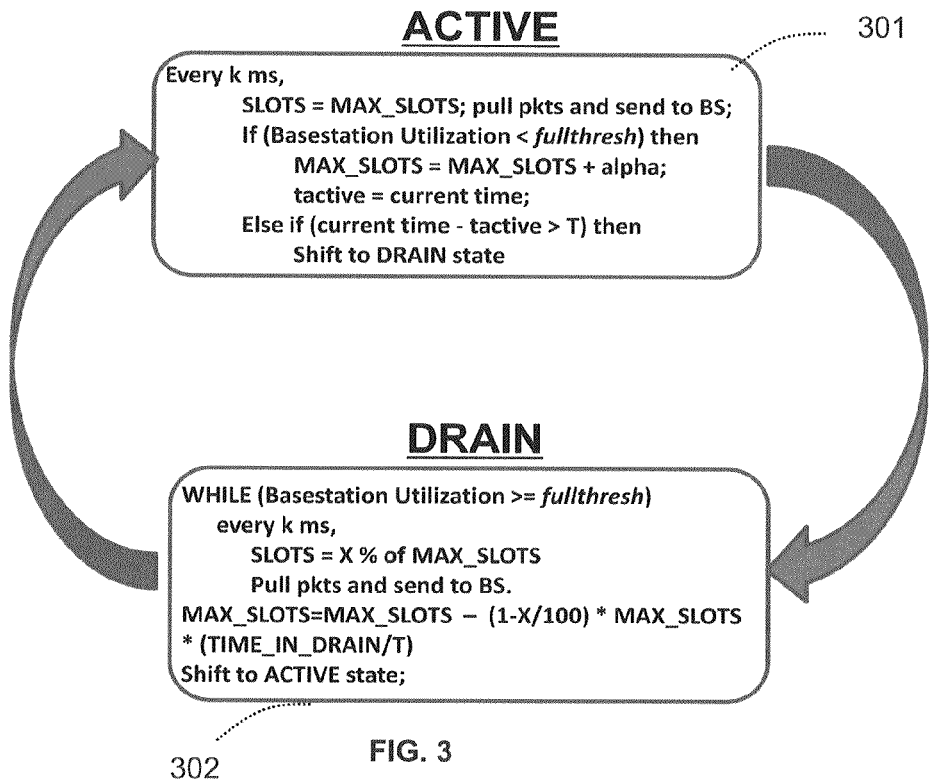
FIG. 3 is an exemplary diagram detailing the synchronizer aspect shown in FIG. 1B, in accordance with the invention.

Every k milliseconds (k ms), step 301 of FIG. 3, the synchronizer pulls enough packets from the slice scheduler that will fill the resource slots available in k milliseconds. The number of slots per packet is determined by the average MCS used by the basestation for the specific user. As long as an average is provided, this approach works even for technologies in which varied schemes are used, such as adaptive modulation coding AMC and partially used sub-channelization PUSC in WiMAX. The number of slots available is represented by the variable SLOTS. Logically, each slot represents a fixed number of bytes that can be transmitted.

Without a synchronizer, the order of packets scheduled by the virtualization software would be reordered by the MAC scheduler executing in the basestation. To reduce interference from the basestation's scheduler, the synchronizer ensures that the basestation's buffers are not backlogged at any time and hence, the basestation's flow scheduler does not impact the slice scheduling decisions. In addition, it is required to ensure efficient usage of the basestation wireless resources. Hence, the synchronizer has to continuously adapt to the changing wireless conditions, number of current mobile users etc. to keep the virtualization software in sync. with the basestation.

The above choices for the synchronizer make the configuration of remote virtualization process generic to work for any kind of cellular basestation, since basestations from different providers execute different flow scheduling algorithms. Moreover, since it is difficult to estimate the exact capacity of a basestation, the synchronizer operates in two phases. We elaborate the method in the following section:

The synchronizer operates in 2 states, as shown in FIG. 3. We define "SLOTS" as a frequency-time unit that maps to the maximum number of packets that should be sent to the basestation at any instant. We also maintain a variable "MAX_SLOTS" that keeps track of an estimate of the maximum resource blocks that the basestation supports. The MAX_SLOTS could be different for a basestation at different times depending on the mobile clients currently connected to it. For eg: clients with MIMO will use fewer slots than those without MIMO for the same amount of data. We capture such changes by adapting the value of MAX_SLOTS. The following sections describe the two states of the synchronizer in more detail.

ACTIVE (301): In this state, we maintain the value of SLOTS as the current value of MAX_SLOTS. The rate at which packets are sent to the basestation is proportional to SLOTS. If the basestation utilization in the previous time instant is less than 100% (i.e. Maximum value), MAX_SLOTS is incremented. This step ensures that MAX_SLOTS is kept in sync with the current resource availability at the basestation. The synchronizer switches to the Drain state after time "T" has passed.

DRAIN (302): It may happen that some or all of the queues in the basestation might get backlogged during the active state. To ensure that the queues of the basestation don't get continuously backlogged at steady state, the state of the synchronizer is changed to Drain after "T" seconds in the Active State. T can be set to configurable values such as 0.1, 0.3, 0.5, 1, 2, 3, etc. In the Drain state, the value of SLOTS is set to "X % tage" of the MAX_SLOTS. X, for example, is set to 90 or 95%. Hence, the traffic sent is slightly lower than the current estimated capacity of the basestation. The synchronizer is kept in this state unless the periodically measured basestation utilization falls below 100%. This condition confirms that none of the queues in the basestation are currently backlogged before entering the Active state again. Before switching to the Active state, the value of MAX_SLOTS is reduced by a factor depending upon the time for which the shaper operated in the Drain state. This accounts for the error in overestimation of MAX_SLOTS during the Active state which caused backlogged queues in the basestation. The increment alpha in the active state can be set to a reasonable configurable value such as 10, or 20. The appropriate value depends on the choice of k and T.

From the foregoing, the inventive remote virtualization process will enable substantial advantages. The ability to create virtual basestations and networks by deploying the remote virtualization on remote entities in the network. Since the configuration is generic, the RVS can be used to virtualize basestations with limited control and basestations from different providers. This gives Network Operators the power to virtualize their networks even on existing deployments, and new business models such as isolated corporate bundles, services with reserved network resources.

Figure 4:
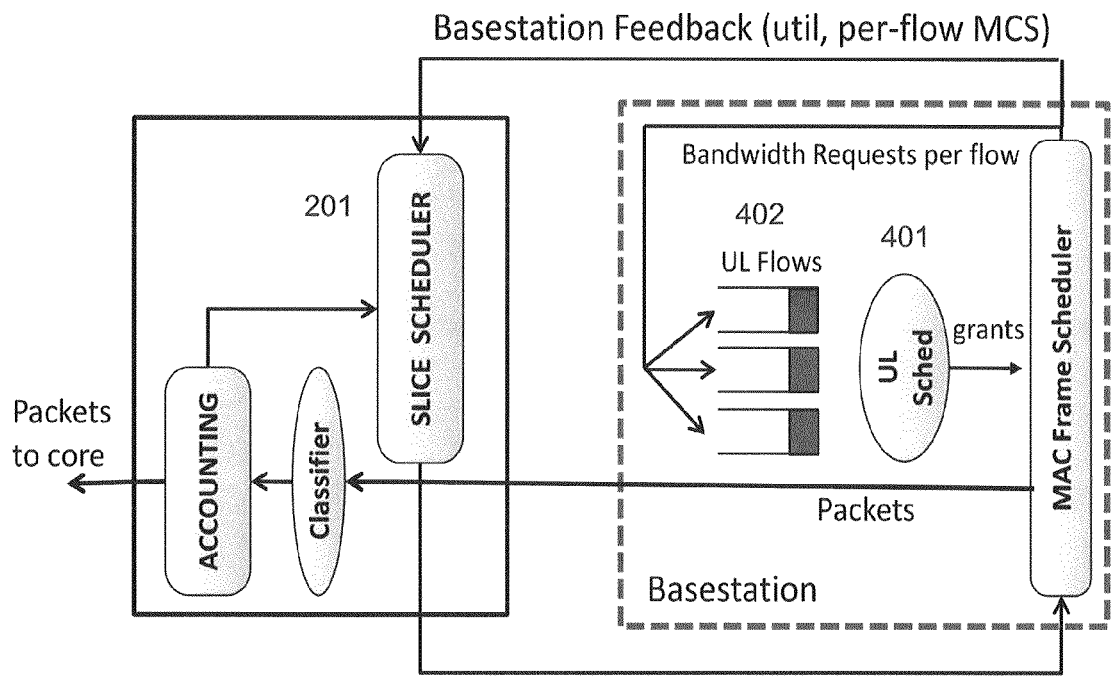
FIG. 4 is an exemplary diagram detailing virtualization of UPLINK wireless resources, in accordance with the invention.

Referring now to FIG. 4, there is shown an exemplary diagram detailing virtualization of UPLINK wireless resources, in accordance with the invention. At the core of virtualization is the consideration of groups of flows into slices, with each slice belonging to an independent entity such as an MVNO, an application service provider, or an enterprise.

For uplink virtualization, we assume that the resource allocation within the basestation for each flow is restricted (shaped) by a parameter maximum sustained rate that can be dynamically adapted by the gateway.

Mainly, the solution includes an uplink slice scheduler 401 that determines the appropriate setting of maximum sustained rate for each flow 402 based on the utilization feedback, the uplink traffic and the average MCS of each flow. This setting is transferred to the basestation, so that the basestation enforces the maximum sustained rate as chosen by the inventive remote virtualization, and as a result achieves virtualization as desired by the inventive remote virtualization even without scheduler modifications.

Figure 5:
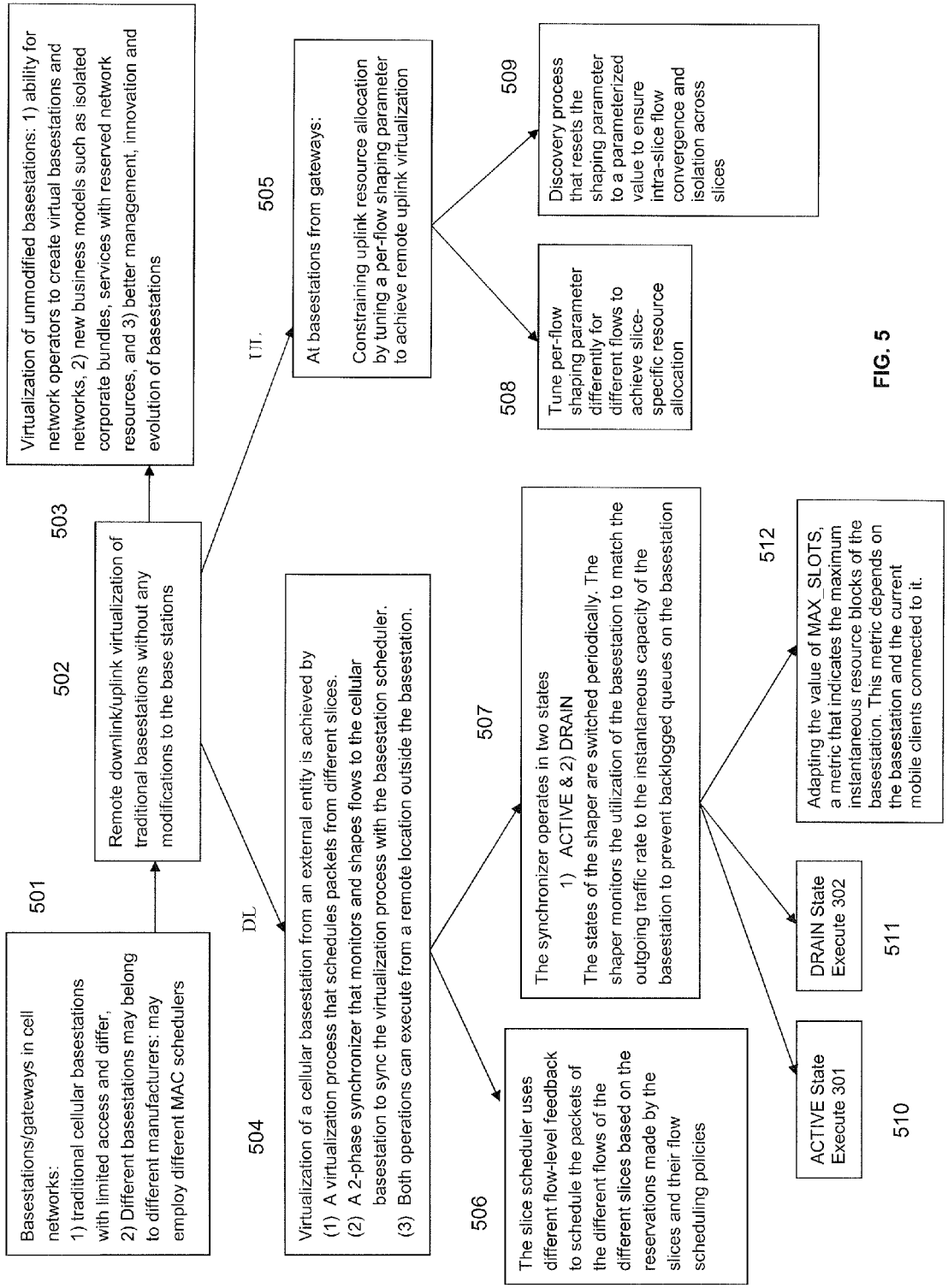
FIG. 5 is a flow diagram of the process of the remote virtualization from the foregoing FIGS. 1B-4, in accordance with the invention.

The inventive remote virtualization process, detailed in FIG. 5 is applied to basestations and gateways in cell networks: 1) traditional cellular basestations with limited access and differ, 2) different basestations may belong to different manufacturers: may employ different MAC 501 without any modifications to the basestations 502. The resulting virtualization of unmodified basestations enables 1) an ability for network operators to create virtual basestations and networks, 2) new business models such as isolated corporate bundles, services with reserved network resources, and 3) better management, innovation and evolution of basestations 503.

In the downlink virtualization mode, 504, virtualization of a cellular basestation from an external entity includes 1) a virtualization process that schedules packets from different slices, a 2-phase synchronizer that monitors and shapes flows to the cellular basestation to sync the virtualization process with the basestation scheduler, and 3) both operations can execute from a remote location outside the basestation 504.

The downlink mode includes the slice scheduler using different flow-level feedback to schedule the packets of the different flows of the different slices based on the reservations made by the slices and their flow scheduling policies 506.

In the downlink mode, the synchronizer operates in two states: 1) ACTIVE and 2) DRAIN. The states of the shaper are switched periodically. The shaper monitors the utilization of the basestation to match the outgoing traffic rate to the instantaneous capacity of the basestation to prevent backlogged queues on the basestation 507. The ACTIVE state encompasses execution of block 301, see FIG. 3. The DRAIN state encompasses execution of block 302, see FIG. 3, 510 and 511, respectively.

The synchronizer also adapts the value of MAX_SLOTS, a metric that indicates the maximum instantaneous resource blocks of the basestation. This metric depends on the basestation and the current mobile clients connected to it.

In the uplink mode at basestations from gateways, the inventive remote virtualization constraints uplink resource allocation by tuning a per-flow shaping parameter to achieve remote uplink virtualization 505. The per-flow shaping parameter is tuned differently for different flows to achieve slice-specific resource allocation 508. Also in the uplink mode, a discovery process resets the shaping parameter to a parameterized value to ensure intra-slice flow convergence and isolation across slices 509.

From the foregoing, it can also be appreciated that the benefits of the inventive virtualization are substantial. The inventive remote virtualization allows a network operator to run isolated virtual networks over unmodified basestations from different manufacturers, leading to lesser complexity and greater manageability of virtualization. The inventive remote virtualization also allows a network operator to provide high quality of services; it allows the operator to run multiple isolated virtual networks that will foster the deployment of enhanced services, enhanced calling and data plans, and higher quality of user experience.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method implemented in a wireless communications system for sharing a basestation among a plurality of entities comprising at least two of one or more mobile network operators (MNOs), one or more mobile virtual network operators (MVNOs), one or more corporate bundle plans, one or more corporate intranets, one or more evaluation testbeds, and one or more services with leased networks (SLNs), the method comprising:

employing said basestation with downlink and uplink flows of information between users;

remotely virtualizing said flows from an entity external to said basestation without any modification to said basestation; and creating virtual basestations or networks responsive to the remote virtualization, wherein the remote virtualization comprises a virtualizing process for scheduling packets from different slices of said flows, wherein the remote virtualization comprises a synchronizer for monitoring and shaping said flows to synchronize said virtualizing process with a scheduler of said basestation, wherein said virtualizing process is executable from outside said basestation, wherein said synchronizer is executable from outside said basestation, wherein said virtualizing process comprises a slice scheduler using different flow-level feedback to schedule packets from said different slices of said flows responsive to reservations made by scheduling policies for said slices, wherein the remote virtualization comprises monitoring use of said basestation to match outgoing traffic to an instantaneous capacity of said basestation to prevent backlogged queues on said basestation, wherein the remote virtualization comprises adapting a metric indicative of maximum instantaneous resource blocks of said flows from said basestation, said metric responsive to said basestation and current users communicating with said basestation, wherein the remote virtualization comprises constraining uplink resource allocation for tuning a per-flow shaping parameter to achieve remote uplink virtualization, wherein said per-flow shaping parameter is tuned differently for different said flows to achieve slice specific resource allocation, and wherein the constraining of uplink resource allocation comprises resetting said shaping parameter to a parameterized value for ensuring intra-slice flow convergence and isolation across slices.

2. A method implemented in a wireless communications system for sharing a basestation among a plurality of entities comprising at least two of one or more mobile network operators (MNOs), one or more mobile virtual network operators (MVNOs), one or more corporate bundle plans, one or more corporate intranets, one or more evaluation testbeds, and one or more services with leased networks (SLNs), the method comprising:

employing said basestation with downlink and uplink flows of information between users;

remotely virtualizing said flows from an entity external to said basestation without any modification to said basestation and including a synchronizer for pulling packets from a slice scheduler of said flows at a rate that matches available capacity of said basestation, said synchronizer being operable in two states for ensuring utilization of wireless resources while avoiding queue build-up in said basestation, scheduling of said flows in said basestation influencing slice scheduling decisions for compromising isolation across different slices of said flows responsive to queues in said basestation getting backlogged; and creating virtual basestations or networks responsive to the remote virtualization, wherein the remote virtualization comprises a virtualizing process for scheduling packets from different slices of said flows, wherein the remote virtualization comprises a synchronizer for monitoring and shaping said flows to synchronize said virtualizing process with a scheduler of said basestation, wherein said virtualizing process is executable from outside said basestation, wherein said synchronizer is executable from outside said basestation, wherein said virtualizing process comprises a slice scheduler using different flow-level feedback to schedule packets from said different slices of said flows responsive to reservations made by scheduling policies for said slices, wherein the remote virtualization comprises monitoring use of said basestation to match outgoing traffic to an instantaneous capacity of said basestation to prevent backlogged queues on said basestation, wherein the remote virtualization comprises adapting a metric indicative of maximum instantaneous resource blocks of said flows from said basestation, said metric responsive to said basestation and current users communicating with said basestation, wherein the remote virtualization comprises constraining uplink resource allocation for tuning a per-flow shaping parameter to achieve remote uplink virtualization, wherein said per-flow shaping parameter is tuned differently for different said flows to achieve slice specific resource allocation, and wherein the constraining of uplink resource allocation comprises resetting said shaping parameter to a parameterized value for ensuring intra-slice flow convergence and isolation across slices.

* * * * *